(12) United States Patent
Lin et al.

(10) Patent No.: US 9,917,489 B2
(45) Date of Patent: Mar. 13, 2018

(54) AXIAL AIR-GAP MOTOR STATOR AND FAN HAVING THE SAME

(71) Applicant: COOLER MASTER CO., LTD., New Taipei (TW)

(72) Inventors: Fu-Lung Lin, New Taipei (TW); Shih-Wei Huang, New Taipei (TW); Chu-Yi Kuo, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 403 days.

(21) Appl. No.: 14/703,116

(22) Filed: May 4, 2015

(65) Prior Publication Data

US 2016/0285323 A1  Sep. 29, 2016

(30) Foreign Application Priority Data

Mar. 27, 2015  (TW) .............................. 104204691 U

(51) Int. Cl.
| | |
|---|---|
| *H02K 1/06* | (2006.01) |
| *H02K 7/14* | (2006.01) |
| *H02K 1/14* | (2006.01) |
| *F04D 25/06* | (2006.01) |
| *H02K 21/24* | (2006.01) |

(52) U.S. Cl.
CPC ........... *H02K 7/14* (2013.01); *F04D 25/0653* (2013.01); *H02K 1/14* (2013.01); *F04D 25/0646* (2013.01); *H02K 21/24* (2013.01)

(58) Field of Classification Search
CPC ........................................................ H02K 1/12
USPC ............ 310/90, 216.009, 216.057, 216.064, 310/216.074, 216.079, 216.096, 216.019, 310/237, 267, 268
See application file for complete search history.

(56) References Cited

U.S. PATENT DOCUMENTS

| | | | | |
|---|---|---|---|---|
| 4,283,646 | A * | 8/1981 | Hansen | ................... H02K 1/145 310/126 |
| 5,942,821 | A * | 8/1999 | Shin | ....................... H02K 1/187 310/67 R |
| 2010/0303647 | A1* | 12/2010 | Ida | ....................... F04D 25/068 417/352 |

* cited by examiner

*Primary Examiner* — Jose Gonzalez Quinones
(74) *Attorney, Agent, or Firm* — Maschoff Brennan

(57) ABSTRACT

An axial air-gap motor stator and a fan thereof includes a motor stator. The motor stator includes multiple metal substrates stacked together. Each metal substrate has a port and multiple pole teeth disposed around the port. The two adjacent pole teeth on each metal substrate are disposed with a magnetic pole and the number of the pole teeth of each metal substrate is a natural number twice the number of the magnetic poles of each metal substrate. The magnetic poles of the metal substrates are arranged in a staggered manner. This avoids the problems of interference of magnetic poles and prevents the magnetic field from being affected.

15 Claims, 6 Drawing Sheets

AXIAL AIR-GAP MOTOR STATOR AND FAN HAVING THE SAME

TECHNICAL FIELD

The disclosure relates to a motor, more particularly to an improved axial air-gap motor stator and a fan thereof.

BACKGROUND

Thin design is the current trend of 3C products. For the requirement of heat dissipation, different kinds of coolers are designed to be as thin as possible. Traditional cooling fans gradually apply fans having the technical feature of axial air-gap, which is relatively thin.

In conventional axial air-gap fans, their motor stators in each magnetic pole usually utilize the same conductor. The need of increasing the number of magnetic poles leads to the interference of N pole and S pole of the magnetic pole because of multiple silicon steel sheets stacked up together. This generates turbulence and affects the accuracy of the control IC of the fan, which may result in many troubles, such as undesirable condition of starting the fan.

Accordingly, the disclosure has developed an improved motor stator and a fan thereof which are capable of solving the aforementioned problems.

SUMMARY

The main purpose of the disclosure is to provide an improved axial air-gap motor stator and a fan thereof, which is thin. The improved axial air-gap motor stator and a fan are with increased number of magnetic poles while is capable of separating the conductors of each magnetic pole of the stator. This way, the N pole and S pole of the magnetic poles are separated in a staggered manner, which does not interfere with each other or affect the magnetic field. In addition, the magnetic circuit is clear so the fan can start properly.

To fulfill the purpose, the disclosure provides an improved axial air-gap motor stator comprising a plurality of metal substrates stacked together. Each metal substrate has a port and a plurality of pole teeth is disposed around the port. The two adjacent pole teeth on each metal substrate are disposed with a magnetic pole and the number of the pole teeth of each metal substrate is a natural number twice the number of the magnetic poles of each metal substrate. The magnetic poles of the metal substrates are arranged in a staggered manner.

Furthermore, the disclosure provides a fan of an improved axial air-gap motor stator comprising a bottom plate with a pivot disposed thereon, a plurality of metal substrates and a fan blade. The plurality of metal substrates are stacked together and stacked with the bottom plate. Each metal substrate has a port and a plurality of pole teeth is disposed around the port. The two adjacent pole teeth on each metal substrate are disposed with a magnetic pole and the number of the pole teeth of each metal substrate is a natural number twice the number of the magnetic poles of each metal substrate. The magnetic poles of the metal substrates are arranged in a staggered manner. The fan blade is pivoted on the pivot. The magnetic poles of the metal substrates are arranged in a staggered manner.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Figure 1:
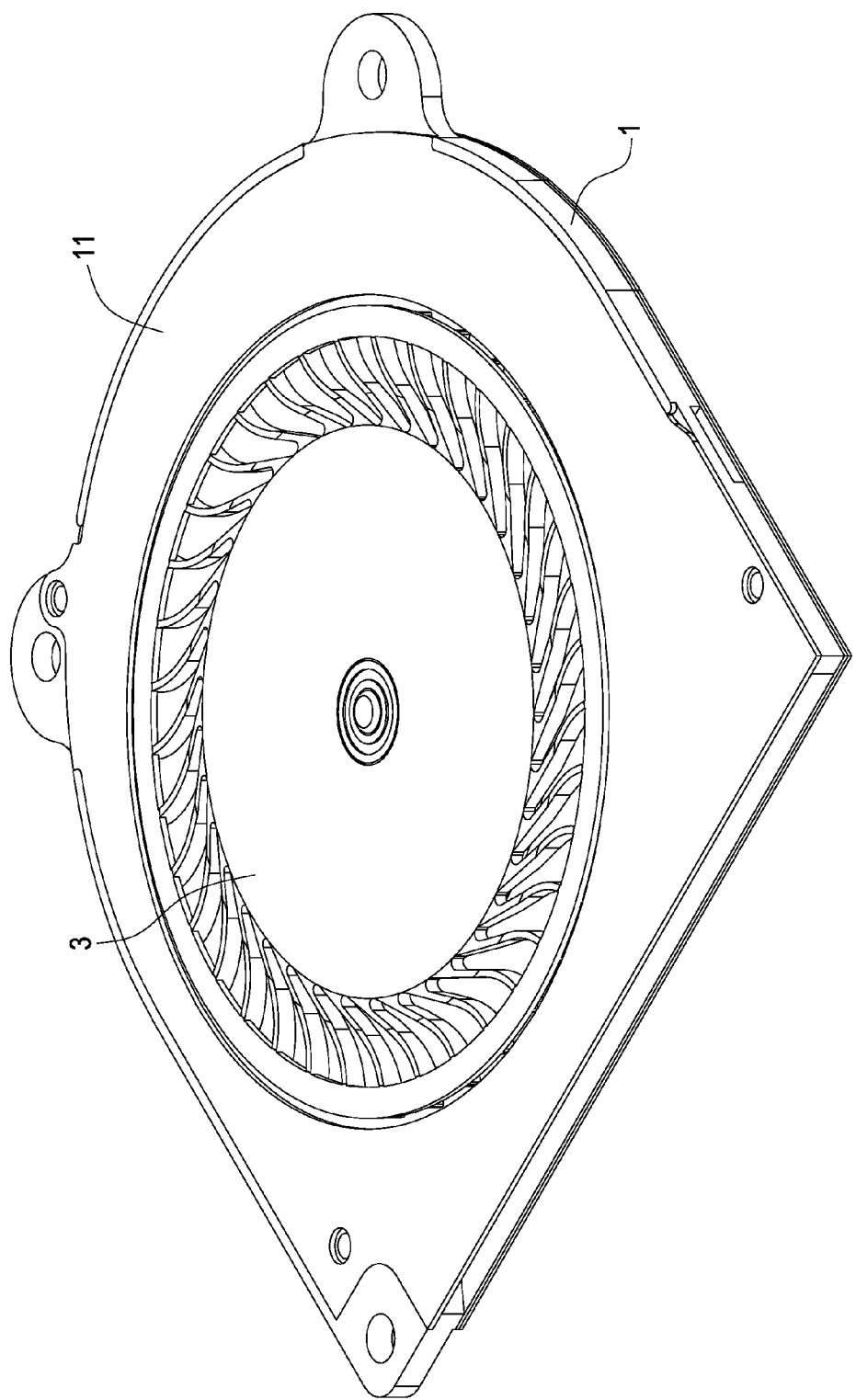
FIG. 1 is a perspective view of a fan according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
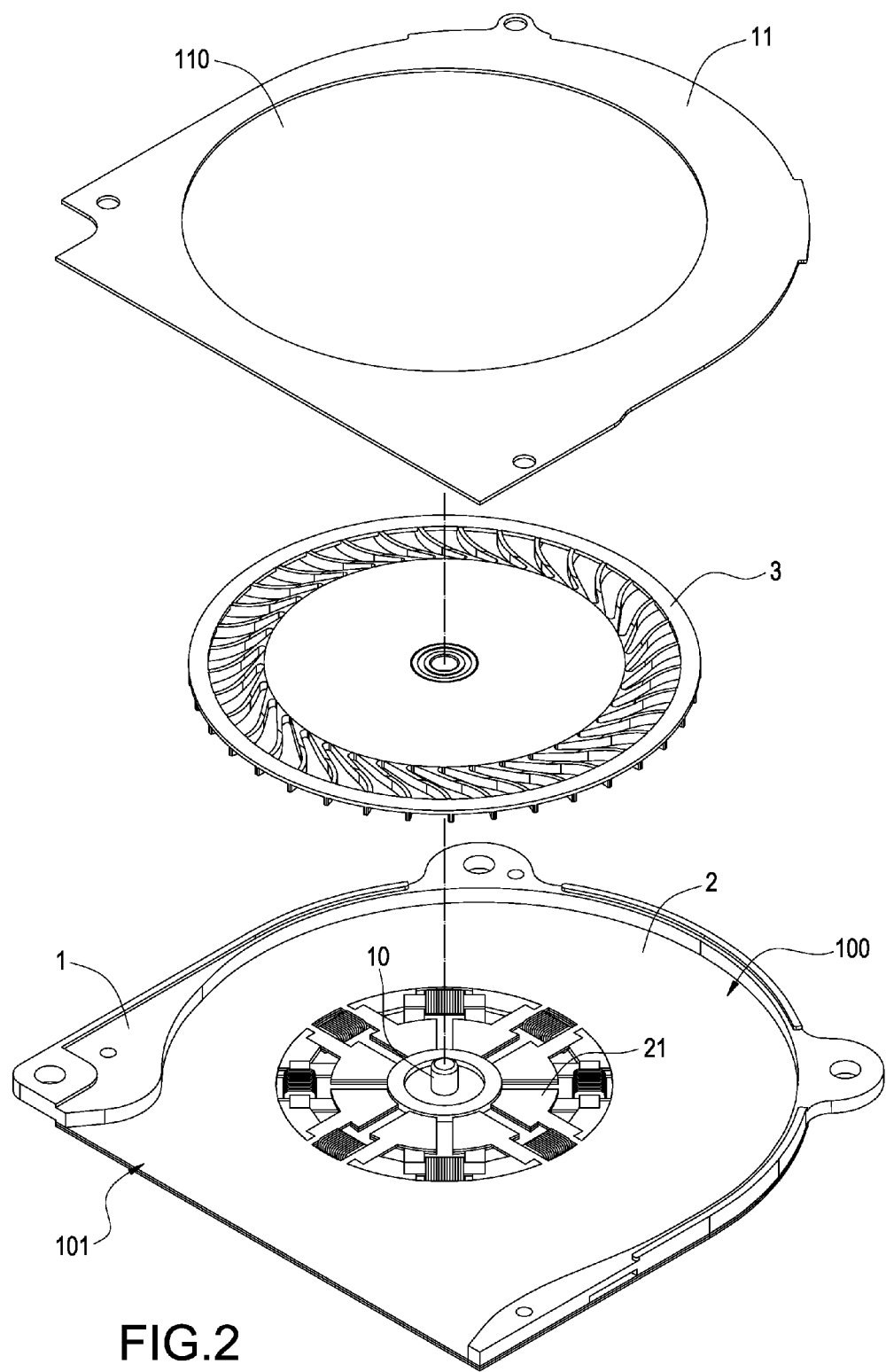
FIG. 2 is an exploded view of the fan according to the disclosure.

FIG. 1 is a perspective view of a fan according to the disclosure and FIG. 2 is an exploded view of the fan according to the disclosure. Referring to FIG. 1 and FIG. 2, the disclosure provides an improved axial air-gap motor stator and a fan thereof. The fan may be a centrifugal fan and includes at least a stator and a rotor. In the embodiments of the disclosure, the fan comprises a bottom plate 1, a plurality of metal substrates 2 and a fan blade 3; wherein:

The bottom plate 1 is for carrying the stator, the rotor or other components of the fan. A pivot 10 is disposed on the bottom plate 1. In the embodiments of the disclosure, a surface of the bottom plate 1 for the pivot 10 to be disposed on forms an air passage area 100 which is recessed. It is not only for the fan blade 3 to be accommodated in to be pivoted on the pivot 10, but also provided for the fan blade 3 to generate air flow during its operation. Additionally, one side of the bottom plate 1 forms an air vent 101 connecting with the air passage area 100. The air vent 101 may be an air outlet or an air inlet based on the actual operation of the fan blade 3.

Figure 3:
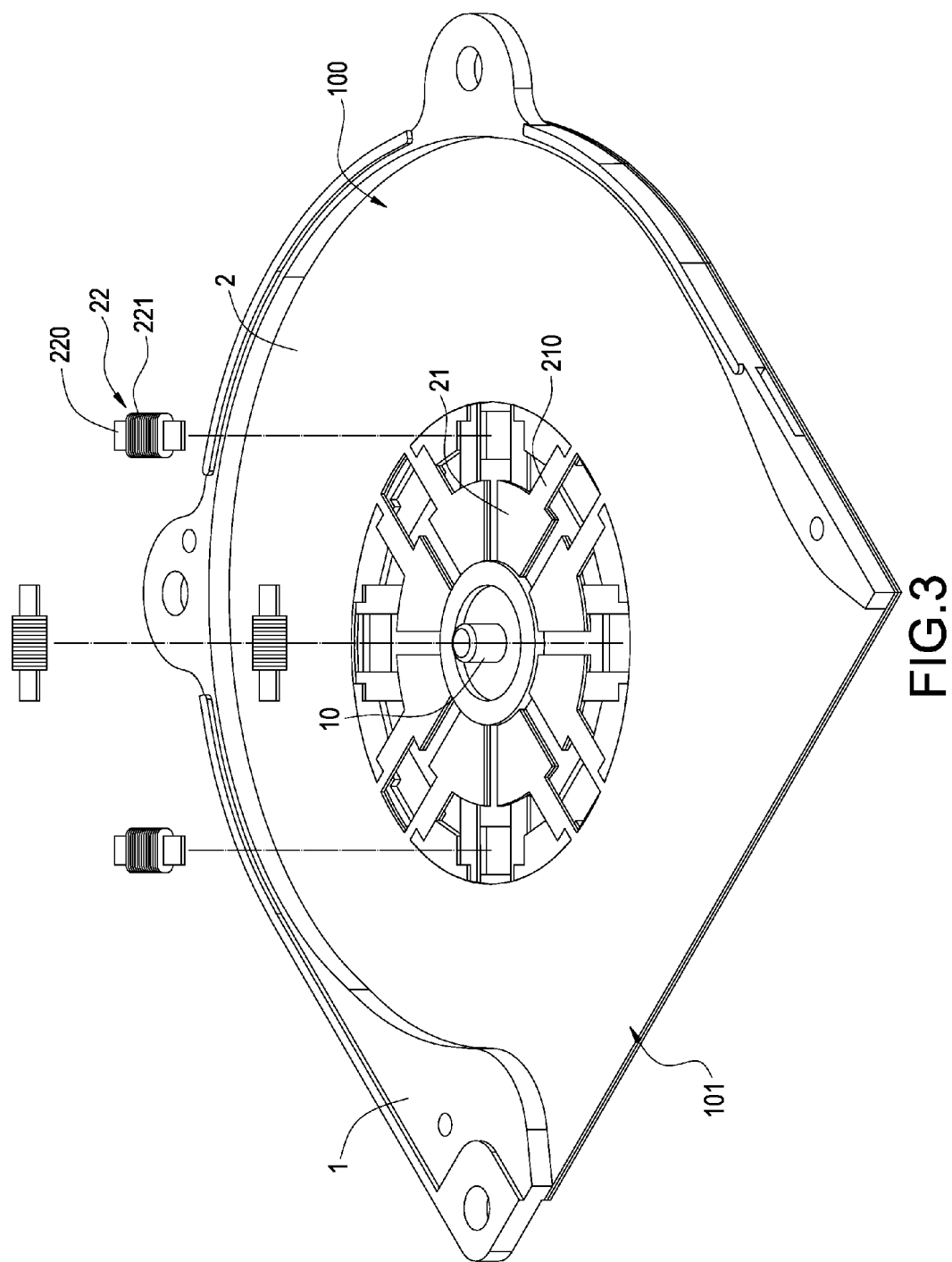
FIG. 3 is an exploded view of a stator disposed on a bottom plate according to the disclosure.
Figure 4:
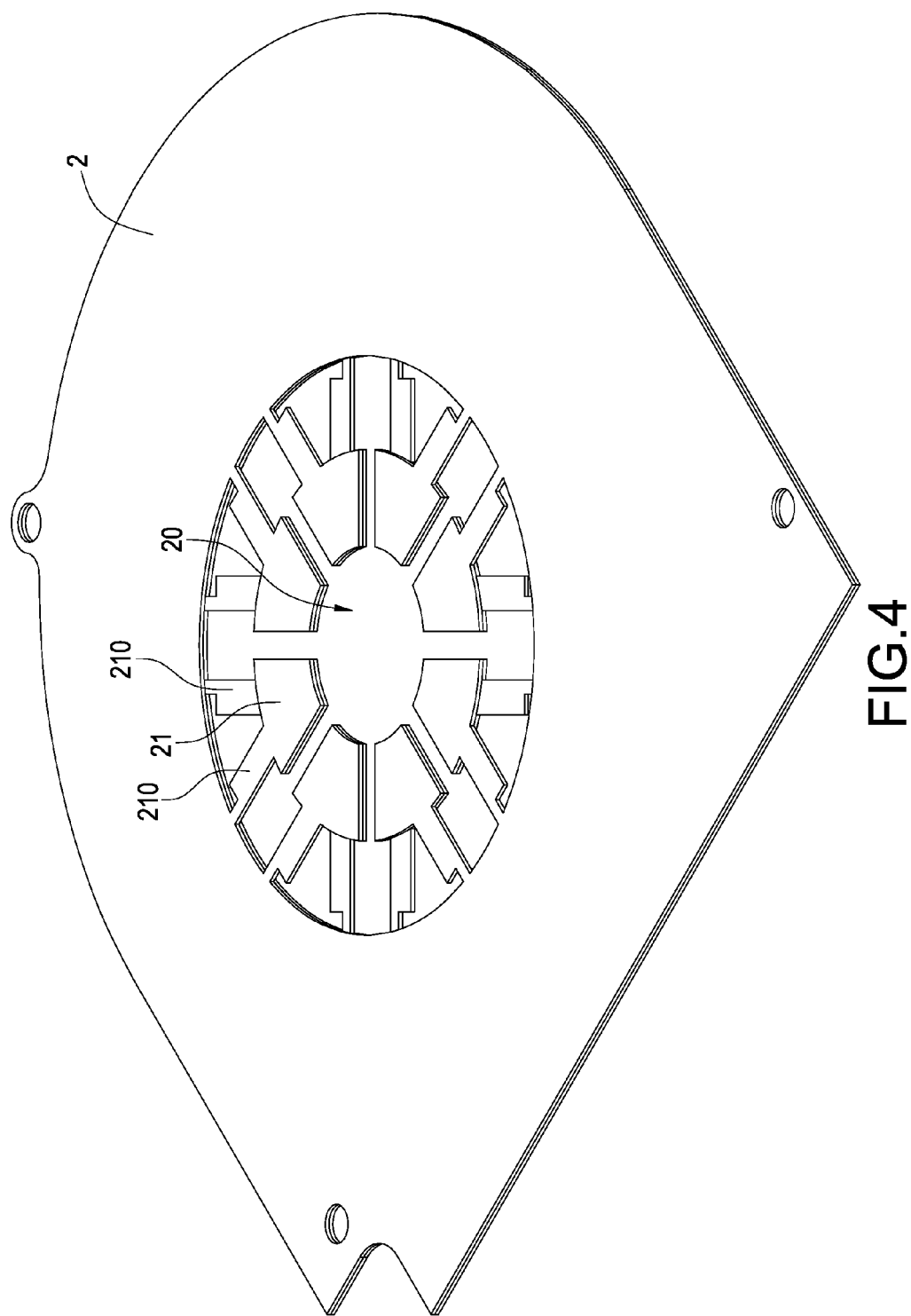
FIG. 4 is a perspective view of stacked metal substrates according to the disclosure.
Figure 5:
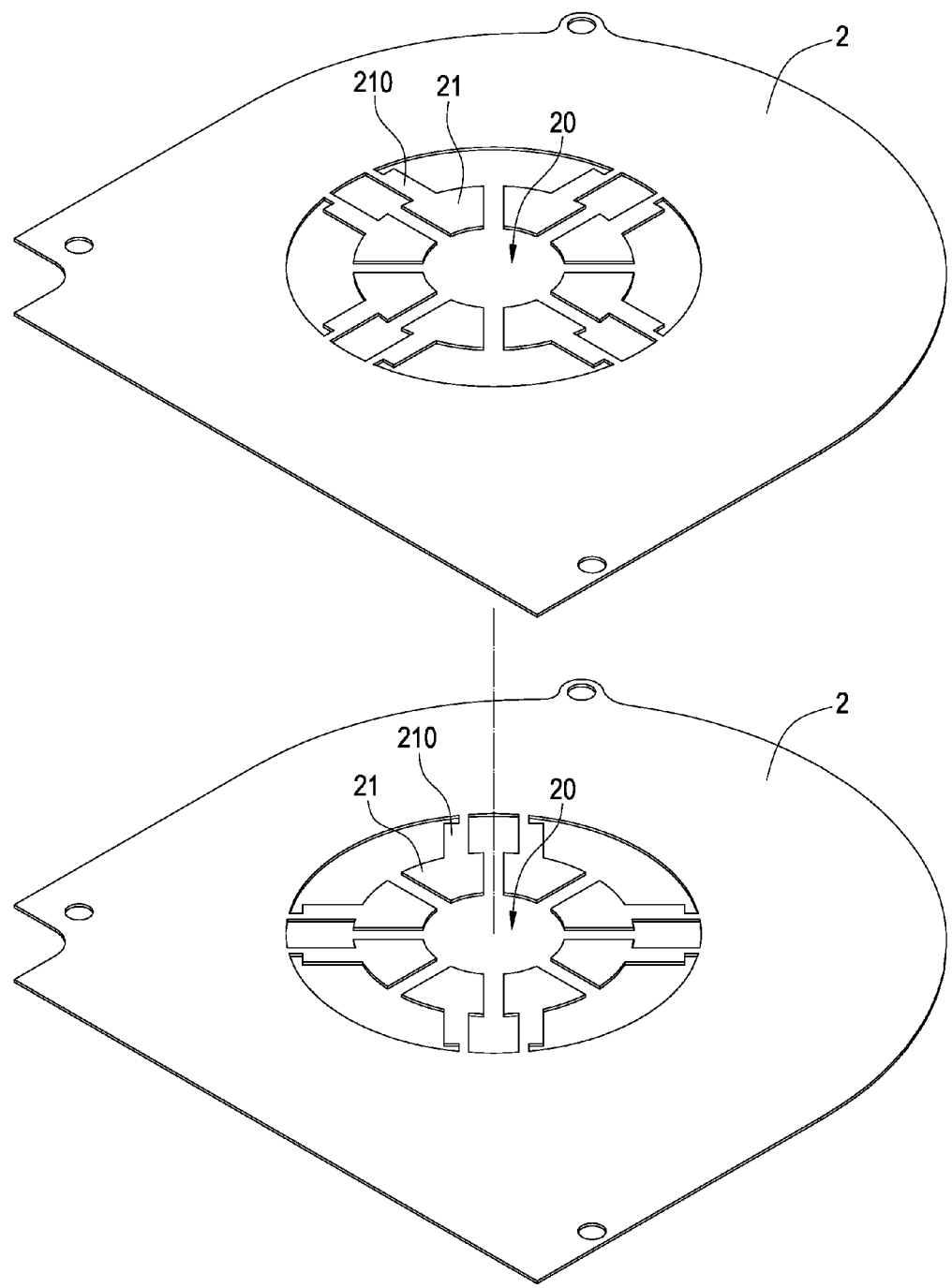
FIG. 5 is an exploded view of the stacked metal substrates according to the disclosure.

Also referring to FIG. 3 to FIG. 5, the metal substrates 2 may be a silicon steel sheets which are stacked up together and then are stacked up with the bottom plate 1. In the embodiments of the disclosure, the bottom plate 1 may be stacked upon the metal substrates 2 by injection molding or by covering them, thereby making the metal substrates 2 which are stacked up together are connected with and fixed to the bottom plate 1. As seen in FIG. 4 and FIG. 5, each metal substrate 2 has a port 20 and a plurality of pole teeth 21 are disposed around the port 20 of each metal substrate 2. The pole teeth 21 each extends and forms a pin 210 and is connected to the inner edge of the port 20 of metal substrate 2, as a single unit. A magnetic pole 22 is disposed between two adjacent pole teeth 21 of each metal substrate 2. Specifically, the number of the pole teeth 21 on each metal substrate 2 is at least twice the number of the magnetic poles 22 on each metal substrate 2, and the multiple is a natural number. As shown in FIG. 3, in the embodiments of the disclosure, the number of the pole teeth 21 on each metal substrate 2 is "8" while the number of the magnetic poles 22 on each metal substrate 2 is "4", but the disclosure is not limited thereto. Furthermore, the number of the pole teeth 21 of each metal substrate 2 is a product of the total number of metal substrates 2 multiplying the number of the magnetic poles 22 of each metal substrate 2. For example, the number of the metal substrates 2 illustrated in the disclosure is "2", and "2" times the number of the magnetic poles 22 of each metal substrate 2 (that is, "4") leads to the product "8". This is the number of the pole teeth 21 of each metal substrate 2. Moreover, when the number of the metal substrates 2 is "3" and the number of the magnetic poles 22 of each metal substrate 2 is "3", the product will be "9". In this scenario, the required number of the pole teeth 21 of each metal substrate 2 should be 9.

Figure 6:
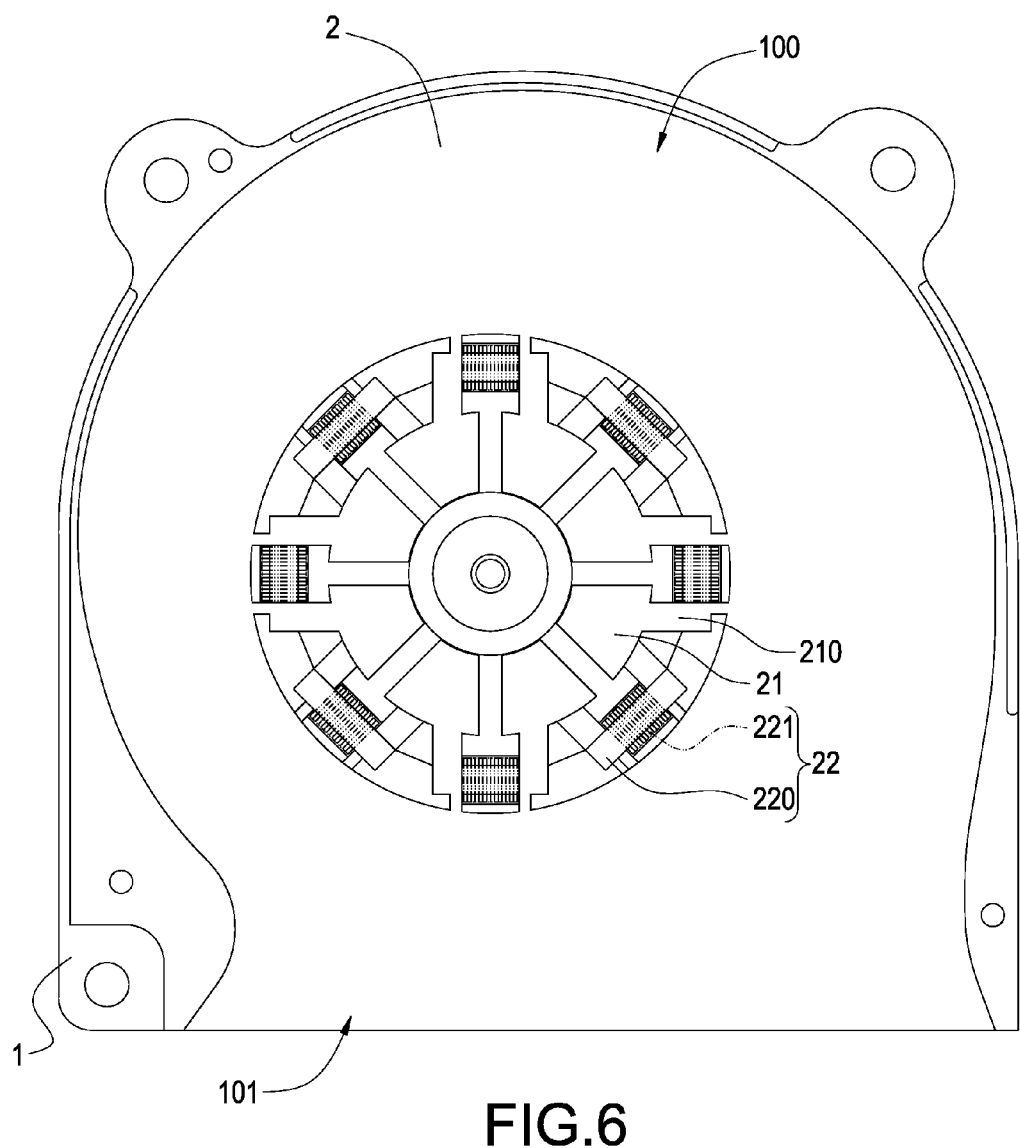
FIG. 6 is a plan view of the stator disposed on the bottom plate according to the disclosure.

As seen in FIG. 3 and FIG. 6, the magnetic poles 22 of the metal substrates 2 in the disclosure are arranged in a staggered manner (namely one of the two adjacent magnetic poles 22 is reversed). Furthermore, along with the relationship between the number of the pole teeth 21 of each metal substrate 2 and the number of the magnetic poles, each magnetic pole 22 of the motor stator is separated effectively and does not affect one another or interfere the magnetic field. Also, the magnetic circuit is clear such that the control IC of the fan is capable of maintaining the accuracy of interpretation and the torque during the start of the motor is excellent. This prevents the fan from any problems related to its start process.

Moreover, each magnetic pole 22 may comprise a magnetic circuit 220 and a winding 221 around the magnetic circuit 220. The magnetic circuit 220 bridges any two adjacent pins 210 of the pole teeth 21 and the pins 210 of the corresponding pole teeth 21 are also arranged in a staggered manner.

Referring to FIG. 1 and FIG. 2, the fan blade 3 is pivoted on the pivot 10 of the bottom plate 1 and may be accommodated in the air passage area 100 of the bottom plate 1. An air shielding plate 11 may further covers the bottom plate 1 and has a fan blade hole 110 corresponding to the fan blade 3. The fan blade hole 110 servers as an air inlet or air outlet for the air hole 101 of the bottom plate 1 and the fan blade hole 110 of the air shielding plate 11, during the operation of the fan blade 3.

Based on the structure illustrated above, the disclosure has provided an improved axial air-gap motor stator and a fan thereof.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. An axial air-gap motor stator, comprising a plurality of metal substrates stacked together, each metal substrate having a port, a plurality of pole teeth being disposed around the port, the two adjacent pole teeth on each metal substrate being disposed with a magnetic pole and wherein the number of the pole teeth of each metal substrate is a natural number twice the number of the magnetic poles of each metal substrate;
   wherein the magnetic poles of the metal substrates are arranged in a staggered manner.

2. The axial air-gap motor stator according to claim 1, wherein each pole tooth extends to form a pin for connecting with an inner edge of the port of each metal substrate, as a single unit.

3. The axial air-gap motor stator according to claim 2, wherein each magnetic pole comprises a magnetic circuit and a winding wound around the magnetic circuit.

4. The axial air-gap motor stator according to claim 3, wherein each magnetic circuit bridges the two pins of the two adjacent pole teeth, and the corresponding pins of the pole teeth are arranged in a staggered manner.

5. The axial air-gap motor stator according to claim 1, wherein the number of the pole teeth of each metal substrate is a product of the number of the metal substrates multiplying the number of magnetic poles of each metal substrate.

6. A fan of an axial air-gap motor stator, comprising:
   a bottom plate with a pivot disposed thereon;
   a plurality of metal substrates stacked together and stacked with the bottom plate, each metal substrate having a port, a plurality of pole teeth being disposed around the port, the adjacent two pole teeth on each metal substrate being disposed with a magnetic pole and wherein the number of the pole teeth of each metal substrate is a natural number twice the number of the magnetic poles of each metal substrate; and
   a fan blade pivoted on the pivot;
   wherein the magnetic poles of the metal substrates are arranged in a staggered manner.

7. The fan of the axial air-gap motor stator according to claim 6, wherein the bottom plate is stacked on the metal substrates by covering them or by injection molding.

8. The fan of the axial air-gap motor stator according to claim 6, wherein an air shielding plate is covered on the bottom plate and the air shielding plate has a fan blade hole corresponding to the fan blade.

9. The fan of the axial air-gap motor stator according to claim 6, wherein a surface of the bottom plate for the pivot to be disposed on forms an air passage area which is recessed, and the fan blade is accommodated in the air passage area.

10. The fan of the axial air-gap motor stator according to claim 9, wherein the number of the pole teeth of each metal substrate is a product of the number of the metal substrates multiplying the number of magnetic poles of each metal substrate.

11. The fan of the axial air-gap motor stator according to claim 6, wherein one side of the bottom plate forms an air vent connecting with the air passage area.

12. The fan of the axial air-gap motor stator according to claim 11, wherein each pole tooth extends to form a pin for connecting with an inner edge of the port of each metal substrate, as a single unit.

13. The fan of the axial air-gap motor stator according to claim 12, wherein each magnetic pole comprises a magnetic circuit and a winding wound around the magnetic circuit.

14. The fan of the axial air-gap motor stator according to claim 13, wherein each magnetic circuit bridges the two pins of the two adjacent pole teeth, and the corresponding pins of the pole teeth are arranged in a staggered manner.

15. The fan of the axial air-gap motor stator according to claim 6, wherein the number of the pole teeth of each metal substrate is a product of the number of the metal substrates multiplying the number of magnetic poles of each metal substrate.

* * * * *